United States Patent
Grunitz

[11] Patent Number: 5,912,020
[45] Date of Patent: Jun. 15, 1999

[54] DEVICE FOR OPERATING AN INJECTION MOLDING MACHINE

[75] Inventor: Otto Grunitz, Wiehe, Germany

[73] Assignee: Mannesmann Aktiengesellschaft, Düsseldorf, Germany

[21] Appl. No.: 08/855,400

[22] Filed: May 13, 1997

[30] Foreign Application Priority Data

May 13, 1996 [DE] Germany .................. 196 20 360

[51] Int. Cl.$^6$ .................................................. B29C 45/64
[52] U.S. Cl. ........................ 425/3; 425/595; 425/DIG. 33
[58] Field of Search ..................... 425/3, 450.1, 451.9, 425/589, 595, DIG. 33

[56] References Cited

U.S. PATENT DOCUMENTS

| | | | |
|---|---|---|---|
| 3,091,810 | 6/1963 | Turner | 425/3 |
| 3,887,312 | 6/1975 | Seary | 425/3 |
| 4,385,877 | 5/1983 | Tanabe | 425/3 |
| 5,322,430 | 6/1994 | Kasai et al. | 425/3 |
| 5,352,394 | 10/1994 | Fulita et al. | 425/3 |

Primary Examiner—James P. Mackey
Attorney, Agent, or Firm—Cohen, Pontani, Lieberman & Pavane

[57] ABSTRACT

A process for operating an injection molding machine with a stationary die plate on a machine bed and a movable die plate, which die plates are lockable during an injection process by magnetic closing elements, the process including the steps of moving the movable die plate toward the stationary die plate to close a mold, simultaneously moving a structural component part enclosing one of the die plates toward one end to a distance of a few millimeters from the other of the die plates, locking a drive of the movable die plate, activating electromagnets arranged at the structural component part enclosing the one die plate by supplying current, adjusting generation of electromagnetic closing force relative to energy level and duration in dependence on an injection process, and at the end of an injection cycle, moving the movable die plate and the structural component part enclosing the one die plate into an end position in which a free space is formed, so that the free space above the machine bed between the die plates can be accessed freely in an open operating state of the injection molding machine.

11 Claims, 2 Drawing Sheets

DEVICE FOR OPERATING AN INJECTION MOLDING MACHINE

BACKGROUND OF THE INVENTION

1. Field of the Invention

The invention relates to a process for operating an injection molding machine with a stationary mold platen or die plate on a machine bed and with a movable die plate which are lockable during the injection process via magnetic closing elements. The invention further relates to a corresponding device for carrying out the process.

2. Description of the Prior Art

A closing unit for an apparatus for the injection molding of thermoplastics is already known from German reference DE 37 15 160 A1. In order to increase or generate the mold closing pressure at the end plate and/or at a portion of the pressing plunger facing the end plate, this closing unit is provided with at least one electromagnet by which the mold closing pressure is generated.

Furthermore, European reference EP 0 669 198 A1 discloses an injection molding apparatus with a core which is fastened to a stationary base plate and an outer mold which is fastened to a movable base plate. Magnet arrangements are attached at both sides of the outer mold to increase the closing force, and have adhesive surfaces. In the closed position, these adhesive surfaces contact armature surfaces on armatures fastened at the stationary base plate. The armature surfaces are formed of ferromagnetic material.

Both known injection molding devices have tie bars along which the movable die plate is guided.

A two-platen machine in which the closing force is applied so as to be controlled by electromagnets is known from European reference EP 0 544 903.

It is disadvantageous that the magnetic devices are arranged directly in the die plates. In this arrangement, the magnetic flux also flows through the die and, as a magnetic parallel connection point, magnetically operating actuators, such as valves of installed hot nozzles, are operatively impaired or not operable at all.

Further, the installation of the magnet coils in the die plates reduces the effective magnet flux surface and accordingly the possible closing force which can be generated.

SUMMARY OF THE INVENTION

Accordingly, it is an object of the present invention to provide an injection molding process and a device in which simple, energy-saving driving elements are used for displacing the movable die plate, in which the cycle time of the injection molding machine is improved, in which a dependable and low-wear locking of the mold is enabled, and in which the free space between the die plates can be freely accessed in the open operating state.

Pursuant to this object, and others which will become apparent hereafter, one aspect of the present invention resides in a process for operating an injection molding machine with a stationary die plate on a machine bed and a movable die plate, which die plates are lockable during an injection process by magnetic closing elements. The process includes the steps of moving the movable die plate toward the stationary die plate to close a mold, simultaneously moving a structural component part enclosing one of the die plates toward one end to a distance of a few millimeters from the other of the die plates, locking a drive of the movable die plates, activating electromagnets arranged at the structural component part enclosing the one die by supplying current, adjusting generation of electromagnetic closing force relative to energy level and duration in dependence on an injection process, and, at an end of the injection cycle, moving the movable die plate and the structural component part enclosing the one die plate into an end position in which a free space is formed so that the free space above the machine bed between the die plates can be accessed freely in an open operating state of the injection molding machine.

In another embodiment of the inventive process the movable die plate is driven with hydraulic means. The structural component part encloses the movable die plate and is coupled to the drive of the movable die plate so that movements of the structural component part and the drive are oppositely directed.

Yet another embodiment of the inventive process includes feeding hydraulic oil displaced from the hydraulic die plate drive when the dies of the die plates contact one another to an accumulator during advancing movement of the structural component part enclosing the movable die plate. Energy collected in the accumulator can be used for moving the movable die plate relative to the structural component part enclosing it when the mold is open.

Another aspect of the invention resides in an injection molding machine having a machine bed, a stationary die plate mounted on the machine bed and a movable die plate movably mounted on the machine bed. Both die plates have dies. Magnetic closing means lock the dies together during an injection process. The molding machine further has first drive means connected to the movable die plate for quickly moving and closing a mold formed by the dies. A structural component part is arranged to enclose one of the die plates and magnetic coils are mounted on the structural component part and are operative to hold the mold closed.

In another embodiment of the invention, second, external driving means are provided for advancing an opening of the structural component part tightly against the die plate which is not enclosed thereby and away from the non-enclosed die plate to form a removal area between the die plates from which workpieces can be freely removed.

In still another embodiment of the inventive injection molding machine, the movable die plate is displaceable with the structural component part. The stationary die plate is constructed as a magnet armature having a free surface corresponding to an end of the opening of the structural component part. In yet an additional embodiment, the die plate enclosed by the structural component part is formed of a diamagnetic or paramagnetic material, for example aluminum alloy.

In a further embodiment of the invention an air gap is formed between an outer edge of the die plate enclosed by the structural component part and an inner surface of the structural component part. The air gap is smaller than 5 mm.

In yet another embodiment of the invention the structural component part is U-shaped. The structural component part can also be cup shaped. If cup shaped, the structural component part is formed of individual U-shaped rod members which have magnets mounted therein or thereon that can be activated. The cup shaped structural component part thereby has a U-shaped cross section.

In another embodiment of the invention the first drive means includes piston-cylinder units arranged between a base of the structural component part and the movable die plate. The first drive means can further include an accumulator, a hydraulic line that connects the accumulator with the piston-cylinder units, and a directional valve arranged in the hydraulic line.

According to the invention, a structural component part is provided which encloses one of the die plates and is provided with magnet coils which can be activated for holding the mold closed. This structural component part, which can be constructed as a sleeve or in a "U" shape, is provided with external driving means and can accordingly be guided relative to the die plate. When the die plates are in the open state, a completely free access to the die is possible.

In another embodiment of the invention, this structural component part can be guided toward the die plate which is not enclosed irrespective of the required path of the die plates relative to one another such that an air gap can be adjusted between the outer edge of the die plate enclosed by the structural component part to the inner surface of the structural component part. This air gap, which is preferably smaller than 5 mm, makes it possible to apply any desired closing force to the die while simultaneously varying the electromagnetic force.

Further, no internal functions of the die are negatively affected in the subject matter of the invention, since the die is not penetrated by the locking magnetic field owing to the design of the movable plate.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
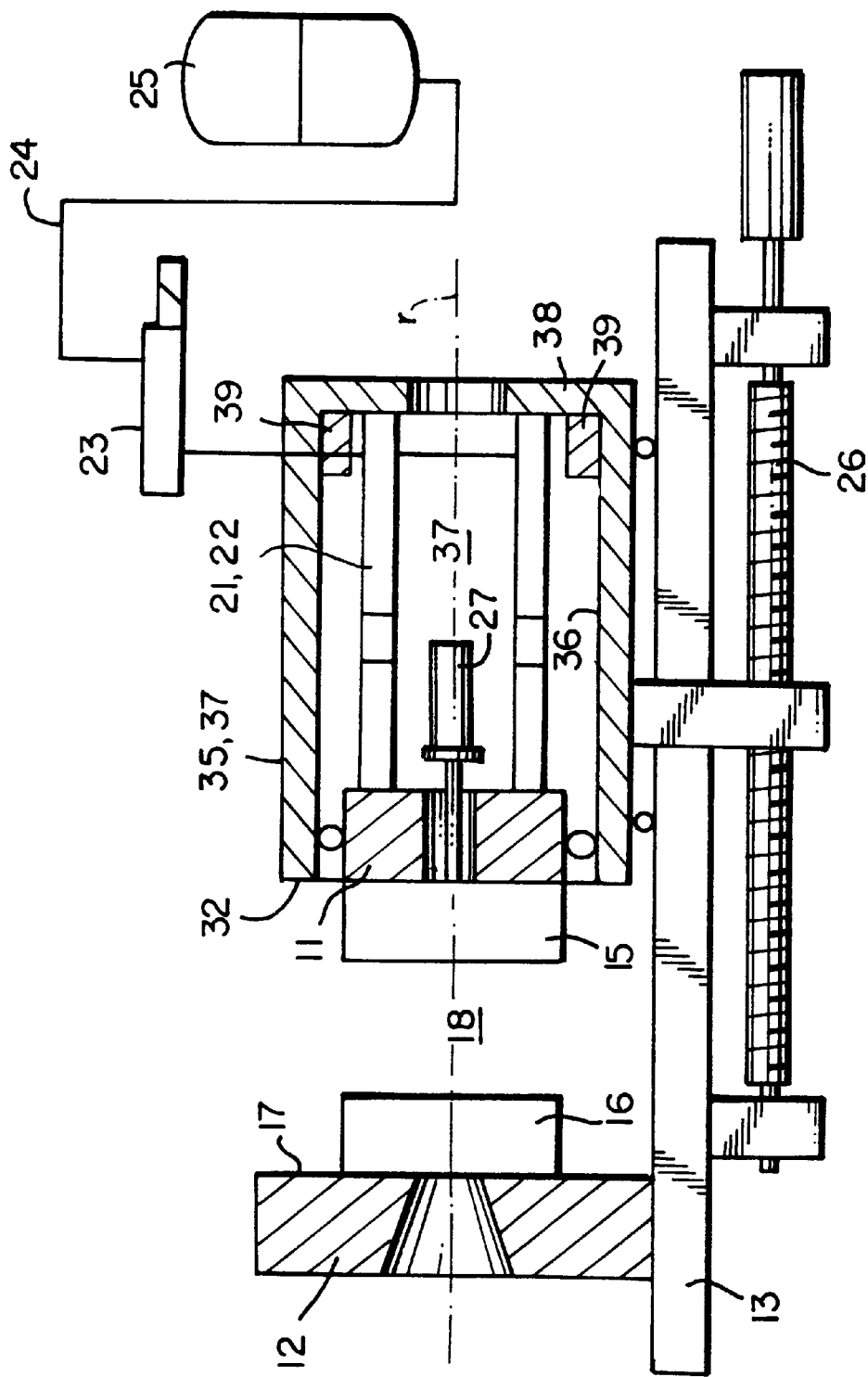
FIG. 1 shows an injection molding machine in the opened state.

Both figures show an injection molding machine with a stationary die plate 12 and a die plate 11 which is movable on a machine bed 13. A mold 14 is located between a movable die 15 and a stationary die 16.

In the opened state, a removal area 18 is located between the stationary die 16 and the movable die 15. In the illustrated example, the movable die plate 11 is enclosed by a structural component part 31. The drawing does not show the embodiment of the invention in which the stationary die plate 12 is also enclosed in the structural component part 31. It is believed readily apparent to those skilled in the art how this would be accomplished.

The structural component part 31 has an end 33 with an opening 32. The end 33 is configured to correspond with a free surface 17 of the stationary die plate 12.

The structural component part 31 is shown as a cup shaped structural component part 36 in the lower part of the drawing and as a U-shaped structural component part 35 in the upper part of the drawing. The U-shaped structural component part 35 is formed of U-shaped rod elements 37 which are not shown in more detail.

Magnet coils 39 are arranged at the base 38 of the cup shaped structural component part 36 and at the end of the U-shaped rod elements 37 opposite to the opening 32.

The structural component part 31 is moved by driving means 26.

An ejector 27 is provided at the movable die plate 11.

Figure 2:
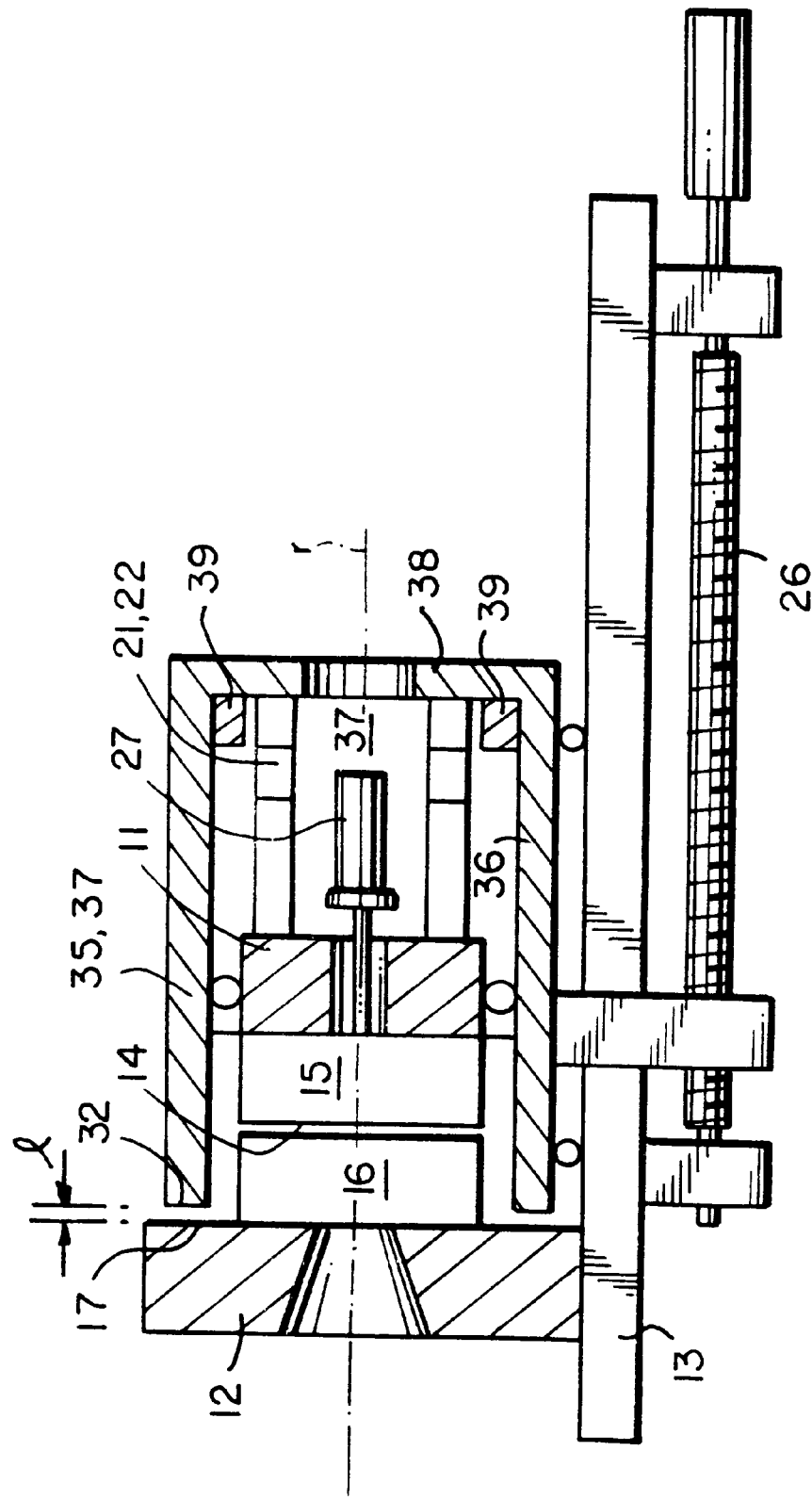
FIG. 2 shows the injection molding machine in the closed state.

In FIGS. 1 and 2, a drive unit 21 is provided between the base 38 of the pot-shaped structural component part 36 or the lower part of the U-shaped rod elements 37, as the case may be, and the movable die plate 11. In the present case, the drive unit 21 is constructed as a piston-cylinder unit 22 which is arranged at both sides of the center axis I.

The piston-cylinder unit 22 is connected with an accumulator 25 via a hydraulic line 24 in which a directional valve 23 is provided.

By means of measurement devices and regulating devices, conventional and not shown, the movable die plate 11 and the structural component part 31 can be moved via the drive unit 21 and the driving means 26 in such a way that the opening of the structural component part 31 can be advanced toward the free surface 17 so that an air gap 1 remains between the free surface 17 and the end 33. This air gap can advantageously be adjusted to less than 5 mm.

The invention is not limited by the embodiments described above which are presented as examples only but can be modified in various ways within the scope of protection defined by the appended patent claims.

I claim:

1. An injection molding machine, comprising: a machine bed; a stationary die plate mounted on the machine bed and having a die and a free surface; a movable die plate movably arranged on the machine bed and having a die; a structural component part having an end and arranged to enclose one of the die plates; magnetic closing means having magnet coils mounted on the structural component part and operative to hold a mold formed by the dies closed so as to lock the dies together during an injection process; and first drive means connected to the movable die plate for quickly opening and closing said mold formed by the dies.

2. An injection molding machine according to claim 1, and further comprising second, external driving means for advancing an opening of the structural component part tightly against the die plate which is not enclosed thereby and away from the not enclosed die plate to form a removal area between the die plates from which workpieces can be freely removed.

3. An injection molding machine according to claim 2, wherein the movable die plate is displaceable with the structural component part, the stationary die plate being constructed as a magnet armature having said free surface corresponding to an end of the opening of the structural component part.

4. An injection molding machine according to claim 1, wherein the die plate enclosed by the structural component part is formed of one of a diamagnetic material and a paramagnetic material.

5. An injection molding machine according to claim 4, wherein the die plate enclosed by the structural component part is formed of aluminum alloy.

6. An injection molding machine according to claim 1, wherein an air gap is formed between the end of the structural component part and the free surface of the stationary die plate.

7. An injection molding machine according to claim 1, wherein the structural component part is U-shaped.

8. An injection molding machine according to claim 1, wherein the structural component part is cup shaped having a substantially U-shaped cross section.

9. An injection molding machine according to claim 8, wherein the cup shaped structural component part is constructed of individual U-shaped rod elements having the magnet coils which can be activated.

10. An injection molding machine according to claim 1, wherein the first drive means includes piston-cylinder units arranged between a base of the structural component part and the movable die plate.

11. An injection molding machine according to claim 10, wherein the first drive means further includes an accumulator, a hydraulic line that connects the accumulator with the piston-cylinder units and a directional valve arranged in the hydraulic line.

* * * * *